(12) United States Patent
Oldham et al.

(10) Patent No.: US 8,037,063 B2
(45) Date of Patent: *Oct. 11, 2011

(54) IDENTIFYING INADEQUATE SEARCH CONTENT

(75) Inventors: Jeffrey D. Oldham, San Jose, CA (US); Hal R. Varian, Danville, CA (US); Matthew D. Cutts, Los Altos, CA (US); Matt Rosencrantz, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/699,418

(22) Filed: Feb. 3, 2010

(65) Prior Publication Data

US 2010/0138421 A1 Jun. 3, 2010

Related U.S. Application Data

(63) Continuation of application No. 11/695,725, filed on Apr. 3, 2007, now Pat. No. 7,668,823.

(51) Int. Cl.
G06F 17/30 (2006.01)

(52) U.S. Cl. ........ 707/723; 707/748; 707/752; 707/754; 709/203

(58) Field of Classification Search .................. 707/723, 707/728, 770, 727, 731, 748, 749, 752, 754; 709/203

See application file for complete search history.

(56) References Cited

U.S. PATENT DOCUMENTS

| | | | |
|---|---|---|---|
| 5,469,354 A * | 11/1995 | Hatakeyama et al. | 707/706 |
| 5,915,249 A * | 6/1999 | Spencer | 707/742 |
| 6,029,195 A * | 2/2000 | Herz | 725/116 |
| 6,460,036 B1 | 10/2002 | Herz | |
| 6,519,586 B2 | 2/2003 | Anick et al. | |
| 6,594,692 B1 | 7/2003 | Reisman | |
| 6,795,820 B2 | 9/2004 | Barnett | |
| 7,050,992 B1 | 5/2006 | Bowman et al. | |
| 7,076,504 B1 | 7/2006 | Handel et al. | |
| 7,181,438 B1 | 2/2007 | Szabo | |
| 7,206,787 B2 * | 4/2007 | Corston-Oliver et al. | 707/749 |
| 7,269,594 B2 * | 9/2007 | Corston-Oliver et al. | 707/749 |
| 7,275,061 B1 * | 9/2007 | Kon et al. | 707/749 |
| 7,290,004 B2 * | 10/2007 | Corston-Oliver et al. | 707/749 |
| 7,290,005 B2 * | 10/2007 | Corston-Oliver et al. | 707/802 |
| 7,668,823 B2 * | 2/2010 | Oldham et al. | 707/723 |
| 2002/0099700 A1 | 7/2002 | Li | |
| 2004/0205065 A1 | 10/2004 | Petras et al. | |
| 2004/0260688 A1 | 12/2004 | Gross | |
| 2006/0074843 A1 | 4/2006 | Pereira | |
| 2006/0277175 A1 | 12/2006 | Jiang et al. | |
| 2007/0162442 A1 | 7/2007 | Brill et al. | |
| 2007/0294240 A1 | 12/2007 | Steele et al. | |
| 2009/0094218 A1 | 4/2009 | Zhang et al. | |

FOREIGN PATENT DOCUMENTS

WO WO2007067703 A2 6/2007

OTHER PUBLICATIONS

Chinese Office Action in CN Patent App. No. 200880018129.8, mailed Jun. 28, 2011, 4 pages.

* cited by examiner

*Primary Examiner* — Shahid A Alam

(74) *Attorney, Agent, or Firm* — Fish & Richardson P.C.

(57) ABSTRACT

Systems and methods for identifying inadequate search content are provided. Inadequate search content, for example, can be identified based on statistics associated with the search queries related to the content.

20 Claims, 6 Drawing Sheets

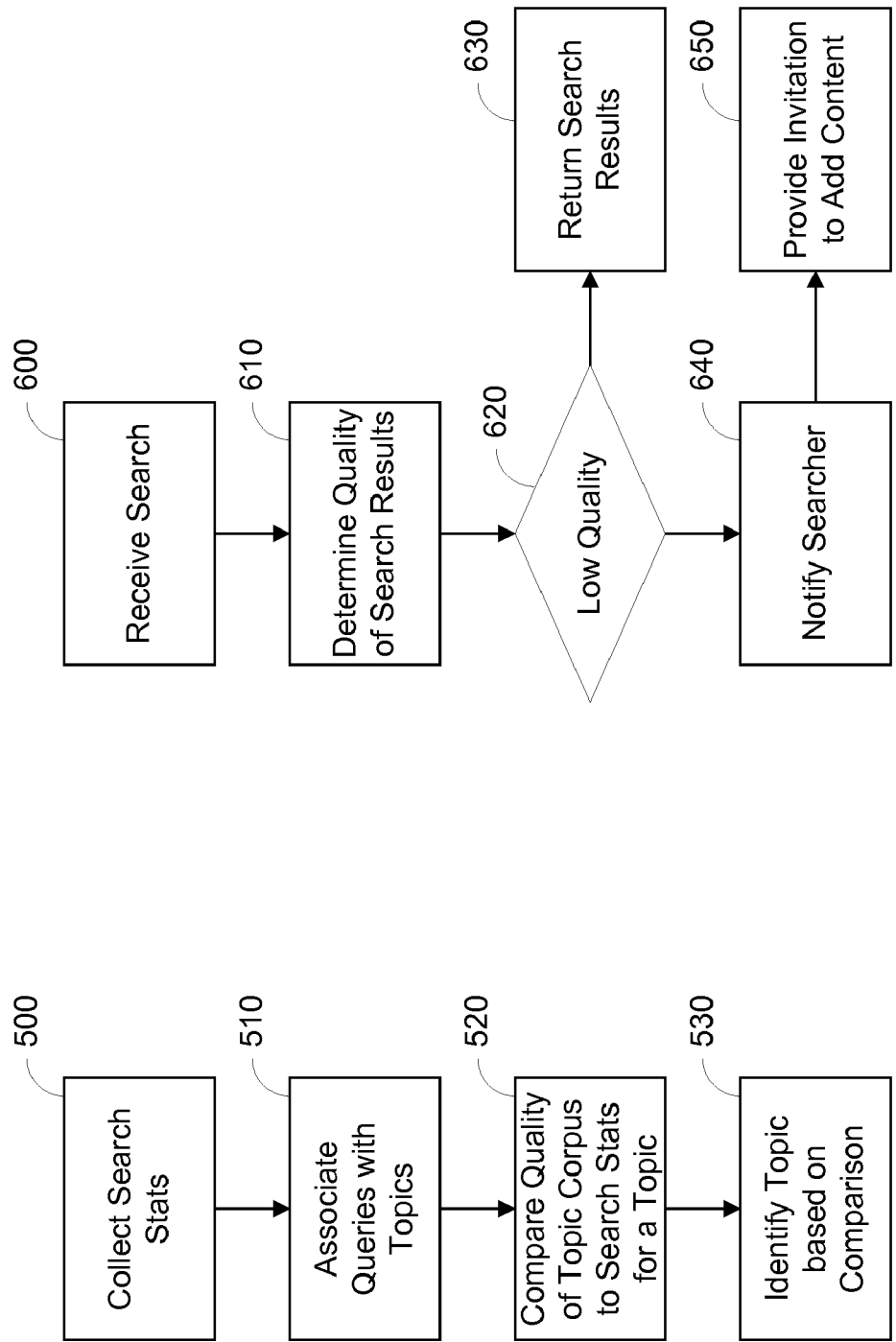

IDENTIFYING INADEQUATE SEARCH CONTENT

CROSS-REFERENCE TO RELATED APPLICATIONS

This application is a continuation application of and claims priority to U.S. application Ser. No. 11/695,725, filed on Apr. 3, 2007, entitled "IDENTIFYING INADEQUATE SEARCH CONTENT," the entirety of which is hereby incorporated herein by reference.

BACKGROUND

This disclosure relates to assessing a topic corpus.

The world-wide web provides easy access to an enormous volume of information. This information can be created by any number of content creators, such as, for example, individual users, web publishers, advertising (ad) companies, etc. These content creators can add content to satisfy varying goals. Individual users often create content based upon topics that are of personal interest to the user. For example, an individual user might create content related to a hobby, to provide information to others, or to meet people with similar interests. Web publishers can create content, for example, to display knowledge in a certain area or to sell subscriptions to a site. Ad companies can create content, for example, to entice users to visit a site and to buy products advertised by the site.

If a goal of a website is to attract visitors, it can be difficult to identify topics which are of interest to other users. As such, content creators can try to gauge interest using a variety of mechanisms. For example, some publishers conduct surveys to identify topics that are of interest to users. Surveys can be inaccurate and/or can be manipulated by respondents and/or surveyors. Popular topics can also be identified based upon total number of searches performed related to a keyword.

SUMMARY

Disclosed herein are systems and methods for assessing topic corpus. In one implementation, a system can include a statistics collection engine, a statistics analysis engine, a comparator and a topic distribution engine. The statistics collection engine can operate to generate query statistics associated with one or more queries received from browsers. The statistics analysis engine can operate to divide the queries into topics and to generate topic statistics associated with the topics. The topic statistics can include an aggregate rank or an aggregate relevance of a topic corpus associated with the topics. The comparator can operate to identify a topic based upon a comparison of the topic statistics with the query statistics, and the topic distribution engine can notify one or more users of an identified topic.

Methods of this disclosure can include: determining statistics associated with a first topic; determining if the first topic is underserved based on the statistics; and, inviting additional content for inclusion in a topic corpus associated with the first topic based on the determination.

In one aspect, methods are disclosed which classifies a topic corpus based on the quality of the corpus and analysis of search logs.

Suggestions based on the identified topic corpus can be provided to content creators for the creation of additional content that is desired by other users based on search logs.

Feedback based on the identified topic corpus can also be provided to a searcher indicating that a topic corpus is not of high quality, thereby alerting the searcher that the topic corpus might be inadequate based on the query provided.

Suggestions can also enable a content creator to provide content for profit based upon subscriptions obtained from users or advertising revenue obtained from placement of advertising on a website associated with the content.

BRIEF DESCRIPTION OF THE DRAWINGS

FIGS. 5-7 are flowcharts illustrating exemplary methods for identifying inadequate web content.

DETAILED DESCRIPTION

Systems and methods of this disclosure can operate to identify published (e.g., web-based publication) content that is inadequate based on, for example, analysis of search logs. Search queries from search logs can be analyzed to find relationships between search queries. Related search queries, for example, can be species associated with a genus, such as a topic. Associating search queries as being related to a topic can facilitate identification of a topic corpus based on search results for the related search queries. Analysis of a topic corpus can facilitate identification of, for example, a quality of the content associated with a topic. Search queries can also be analyzed to determine popularity of a particular topic, as can be derived, for example, based on the total number of search queries for a topic have been received. Comparison of the popularity of a search with the quality of content found within a topic corpus can provide a determination that the content is inadequate based on, for example, the popularity of search queries associated with the topic.

Figure 1:
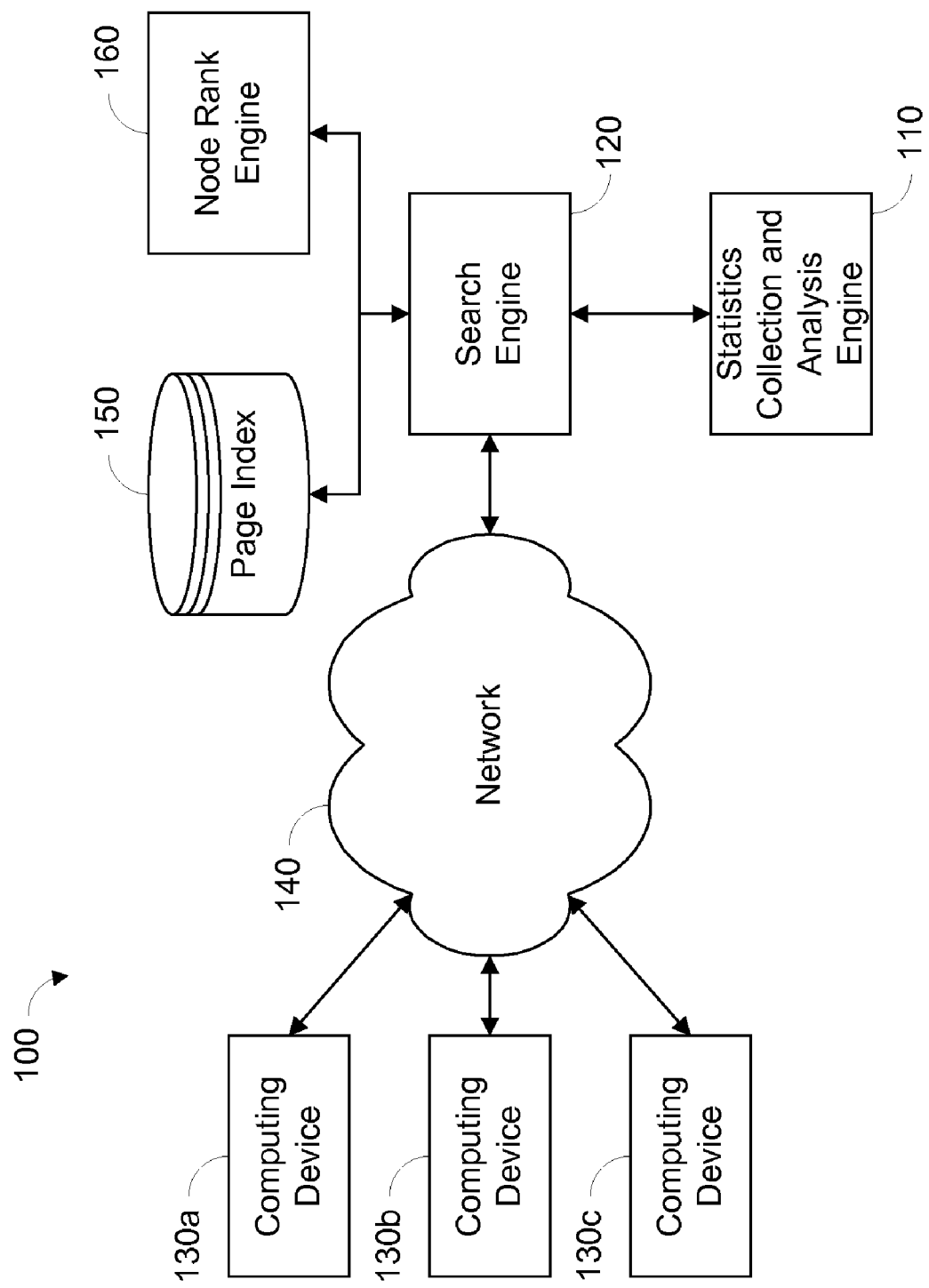
FIG. 1 is a block diagram of a network environment including a statistics collection and analysis system.

FIG. 1 is a block diagram of a network environment 100 including a statistics collection and analysis system. A statistics collection and analysis engine 110 can collect statistics from a search engine 120. The search engine can receive queries, for example, from one or more computing devices 130*a-c* through a network 140. The search queries can be parsed and compared to a page index store 150. The analysis of the query with respect to the page index store 150 can result, for example, in an information retrieval (IR) score. The information retrieval score can measure the relevance of a document (e.g., a web page) to a search query.

The documents found to be relevant to the search query can be analyzed for rank by the node rank engine 160. It should be understood that in some examples, the node ranking can be performed offline and stored. A node ranking can then be retrieved from a node rank store through the node rank engine 160. The node rank can be based, for example, on the number of nodes linking to the current node, and the reputation of those nodes. Node ranking is described, for example, in U.S. Pat. No. 6,285,999, entitled "Method for Node Ranking in a Linked Database," which is hereby incorporated by reference.

The node rank can be combined with the IR score to determine an ordering in which the results are presented to the searcher. Search engines 120 and other services, such as those permitting queries, can collect unserved and underserved queries. Unserved queries, for example, can include any queries for which the search engine is unable to find relevant content. Underserved queries, for example, can include any queries for which the demand for the content outweighs the supply or quality found in the topic corpus. Search engines and other such services can optionally filter, classify, and aggregate unserved and underserved queries. Internet-based, general-purpose search engines, for example, enable searching for any topic and provide results of the search to its user(s). Queries, for example, can be text-based and results can be provided in the form of lists of associated web pages. For some queries, few results and/or only low-quality results are returned. The search engine can collect the queries in a repository of underserved queries.

The collection of such data is not limited to just internet-based, general purpose search engines such as, for example, search engine 120. Any system operable to process queries and return results or providing services can suffice. For example, many software programs' help features solicit text, returning results. These software programs can collect the information described above.

In one implementation, a statistics collection and analysis engine 110 can collect information about the queries being submitted to the search engine 120. For example, the statistics collection and analysis engine 110 can receive the queries as the queries are submitted to the search engine 120. The statistics collection and analysis engine 110 can also perform an analysis of the search queries to identify which queries can be grouped together into a topic. The topic, for example, can describe a genus to the species described by the search queries. The search engine 120 can provide category-based pages with an interactive search. In another implementation, queries can be annotated with the most specific category associated with the query. In another implementation, the search engine 110 can map a set of strings comprising a search query into a taxonomy. These taxonomy categories can be computed and associated with stored queries. In other implementations, queries can be aggregated into categories for storage in a data store. In such implementations, the queries themselves might not be stored in the data store based on storage of the category, or can be clustered to identify groups of queries that can be associated with a category or topic.

The statistics collection and analysis engine 110 can also determine the relevance (e.g., the IR score) of documents associated with a search query (e.g., a topic corpus) to identify a quality associated with the results of the query. In some examples, the statistics collection and analysis engine 110 can combine the relevance with a reputation (e.g., node ranking) to determine quality associated with the topic corpus associated with the query. In some examples, the statistics collection and analysis engine 110 can include a comparator, for example, that can compare the popularity of a search to the quality of the topic corpus. Such a comparison can be used, for example, to determine whether the topic is adequately served by the topic corpus.

In addition to underserved queries entered in a query system, other related data clarifying queries' meanings or assisting in providing information about the underserved topics can be collected and analyzed by the statistics collection and analysis engine 110. Characteristics directly related to queries such as language distribution, geographic distribution, demographic distribution, and time distribution can also be collected by the statistics collection and analysis engine 110. Queries that are associated with a time distribution can be an indication, for example, that a query is popular around particular holidays, days of the week, and times of the day. In some implementations, query frequency can also be collected, and a source associated with queries can be annotated, for example, when the queries come from multiple sources. Thus, the statistics collection and analysis engine 110 can be configured to collect a variety of information which can be used to analyze content quality and/or popularity.

In some examples, a search engine 120 can notify a searcher that quality associated with the topic corpus is low, for example, in comparison to topics which are similarly popular based on search logs. The search engine 120 can infer from the searcher's interest in the subject that the searcher is interested in the subject and thus the searcher might have more information that can be included in the topic corpus. The search engine 120 can use the notification to invite the searcher to provide additional content for inclusion in the topic corpus. Notification provided to a searcher with the search results, for example, can help to ensure that the topic is suggested at a similar rate to the demand for the topic.

Figure 2:
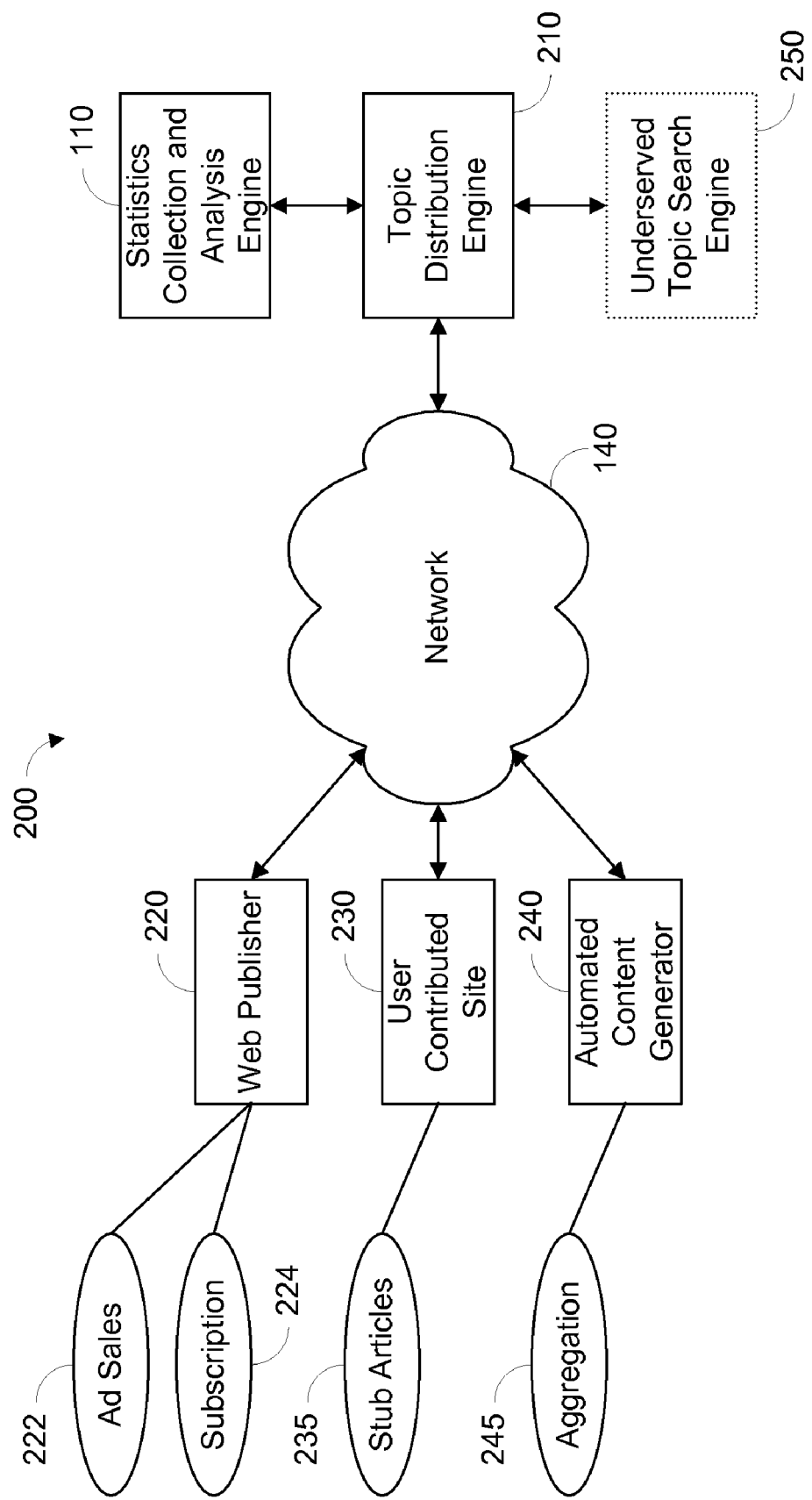
FIG. 2 is a block diagram of a network environment including a system to suggest topics to content generators.

FIG. 2 is a block diagram of a network environment 200 including a topic distribution engine 210 to suggest topics to content generators 220, 230, 240. A statistics collection and analysis engine 110 can identify areas (e.g., topics) having inadequate content and communicate these areas to a topic distribution engine 210. The topic distribution engine 210 can provide topics comprising the identified areas to content generators 220, 230, 240. In one implementation, topic suggestions can be provided to content generators 220, 230, 240 that have knowledge about the suggested topic. For example, an underserved sports topic can be suggested to a sports-related publisher.

The content generators 220, 230, 240 can include a variety of different mechanisms for creating additional content for the topic corpus. For example, the content generators 220, 230, 240 can include web publishers 220. Web publishers 220 can be, for example, a business enterprise operating to create content for consumers. The web publishers 220, for example, can operate based on an ad sales model 222. In this model, the web publishers can create content available on an associated website for free. The web publishers can then collect visitor statistics and sell advertising space on the associated website to advertisers based on the number of visitors viewing the website.

Alternatively, web publishers 220 can operate on a subscription based model 224. For example, web publishers 220 can sell subscriptions to users in exchange for online access to the content created by the web publisher. Such web publishers can include, for example, newspaper websites, encyclopedia websites, dictionary/thesaurus websites, etc.

Although there is an incentive for web publishers 220 to create web pages, the web publishers 220 frequently are not aware of demand for particular types of information, and thus do not know which information to make available. A search provider (e.g., search engine 120 of FIG. 1) has access to a wide variety of information requests and can also measure the availability of corresponding results. A statistics collection and analysis system 110 can compile instances where few quality search results can be found for a term, and a topics suggestion engine 210 can suggest to the searcher that more information is needed. The search provider has an incentive to provide statistics collection engines 110 and topic distribution engine 210 because the search provider's goal is to provide high quality information in order to maintain user satisfaction and loyalty to the search provider. When there is no high quality content, the user might become dissatisfied with the search provider.

If the search provider includes a publisher-incentive system, the search provider has an additional incentive to encourage additional content. For example, if the searcher has expressed an interest in the topic (which can be inferred from the entry of query), the search provider can request that the searcher publish web pages on the topic(s), perhaps by researching the subject (offline and/or online) and creating content based on the research.

If the search provider includes a publisher-incentive system, the searcher may receive additional benefits. Publisher incentive systems can also operate to encourage high quality information by comparing the additional content to queries on the topic, and/or node ranking(s) associated with the document after publication. For example, publisher incentive systems can set the incentives according to the demand for the underserved topics, with a higher reward for underserved topics in high demand and a lower reward for topics with less demand, thereby providing a progressive publisher incentive system.

The content generators 220, 230, 240 can also include user contribution sites 230. User contribution sites such as, for example, a wiki site, enable a broad range of users to create and publish content. User contribution sites 230 can create, for example, stub articles 235 based upon suggestions from users. Stub articles 235 can operate, for example, to invite additional contribution from other users that might have knowledge about a subject outside of the knowledge possessed by those creating the stub articles 235. In some implementations, the topic distribution engine 210 can provide article suggestions to user contribution sites 230, based upon the statistics collection and analysis engine 110. The user contribution sites 230 can then generate stub articles 235 based on the article suggestions for inclusion in the user contribution sites 230. Inclusion of a stub article 235 can also operate to notify searchers of inadequate content at a similar frequency to the frequency with which a topic is searched.

The content generators 220, 230, 240 can also include automated content generators 240. Automated content generators, for example, can operate to provide an aggregation 245 of content from multiple sites into a single page. An automated content generator 240, for example, can copy content from multiple sites and generate a single document that includes the copied content. In one implementation, the automated content generator 240 can be configured to copy content only from specified sites. This can enable the automated content generator 240 to copy content only from sites/users with whom the automated content generator 240 has a license. The automated content generator 240 can also provide, for example, an aggregation 245 of links to content related to a particular topic. The automated content generator 240 can be combined with web publishers 220 or user contribution sites 230 to provide stub information for the creation of new content.

In some implementations, the statistics collection and analysis engine 110 can determine content quality across multiple languages. In such implementations, the topic distribution engine 210 can provide the quality associated with results from various languages. The quality results can indicate to content generators 220, 230, 240 that quality of the topic corpus is poor in a particular language, while being adequate in other languages. Such information can be used by content generators 220, 230, 240 to generate additional content in the particular language where the topic corpus is determined to be of poor quality.

The topic distribution engine 210 can also provide topic suggestions through a variety of interfaces. For example, the topic distribution engine 210 can provide a list of topics warranting additional documents using a web interface to information providers such as Wikipedia.

Alternatively, a search provider (e.g., search engine 120) can provide a separate service for searching through suggested topics, thereby providing a search engine for topics needing additional information (e.g., an underserved topic search engine 250). An underserved topic search engine 250 can search through a collection of underserved topics and associated data using existing search engine techniques. Such a search engine 250 can facilitate access to topics for publishers wishing to add additional content, because the publishers are provided information about underserved topics if there are any results that match a publisher's query for an underserved topic. Searchers that desire to contribute content to underserved topics, for example, can utilize the underserved topics search engine 250 to determine whether the topic is adequately served.

In some examples, query broadening can be used in conjunction with the underserved topic search engine 250 to identify underserved topics based on data associated with the underserved topics. For example, query broadening can display underserved topics if the language of a search query is relevant to the language of the data associated with the underserved topic. Query broadening, in some examples, could also be used to define the times of display for an underserved topic, for example, particular holiday periods. The underserved topic search engine 250, in some implementations, can be more permissive with query broadening than a typical search engine, because a searcher with information about a species inherently has at least some information about a genus. For example, a person with knowledge of a particular football player and/or football statistic has some knowledge about football, even though that knowledge may be limited to that particular player or statistic.

If multiple underserved topics are relevant to the search, the search engine 250 can rank the matching underserved topics, displaying the results in decreasing rank order and truncating the list as appropriate. Various ranking functions are possible. For example, underserved topics which better match the query might be ranked higher. More frequently requested underserved topics might be ranked higher.

The topic distribution engine 210 can also provide topic suggestions in a variety of formats. In one implementation, the topic distribution engine 210 can reorder the topics based upon which topics are most popular. In another implementation, the topic distribution engine 210 can reorder the topics based upon which topics have the greatest disparity between popularity and content quality. Other formatting schemes can also be used.

In other implementations, the topic distribution engine 210 can further include associated data such as importance associated with a topic or a geographic region of interest associated with a topic, or other associated information. Such data, and/or other associated data, may help a publisher focus on providing content to those areas where content is desired.

Figure 3:
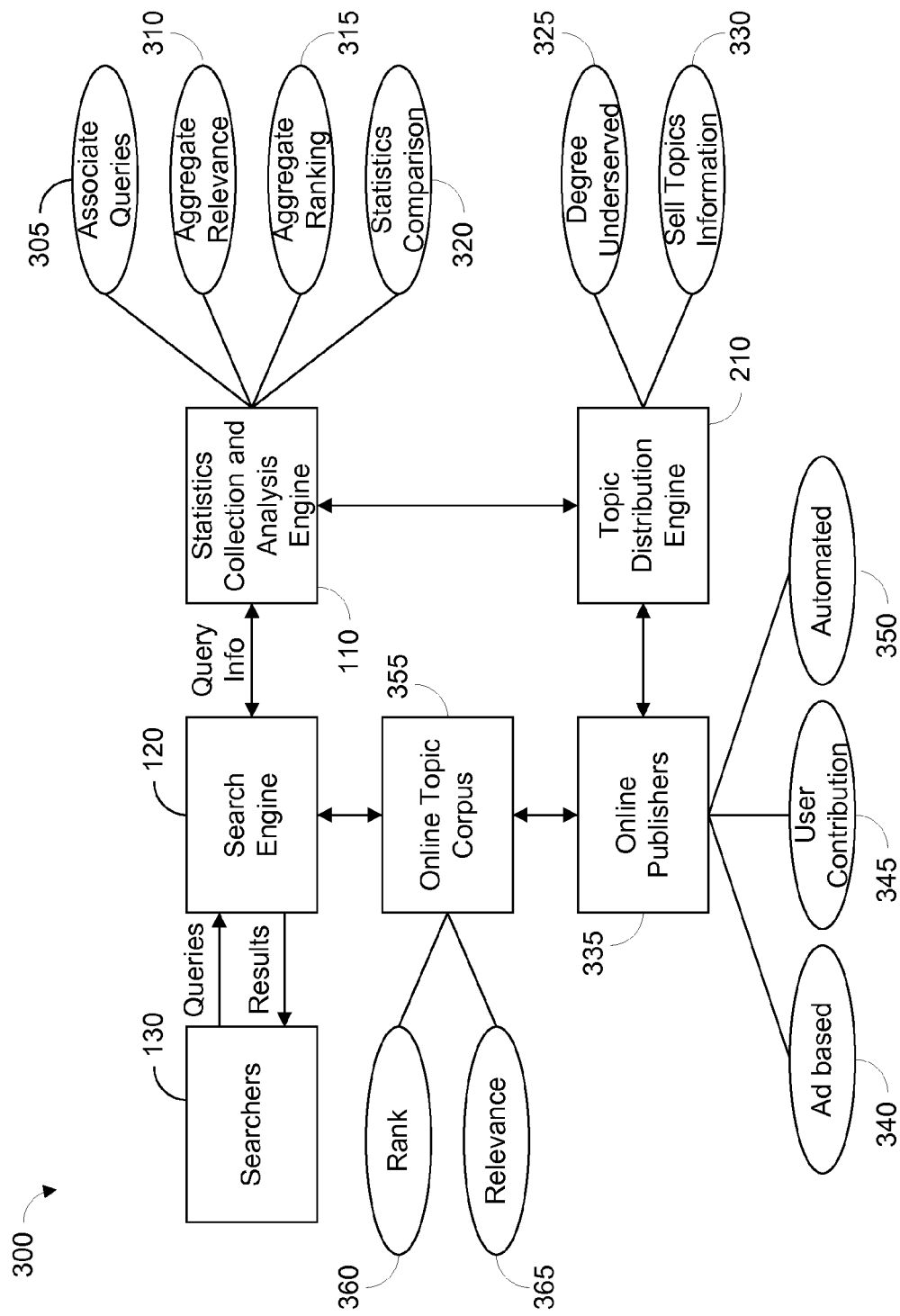
FIG. 3 is a block diagram illustrating data flow in a system to identify inadequate web content.

FIG. 3 is a block diagram illustrating data flow in a system used to identify inadequate published content. By way of example, a web-based publication is shown. Other distribution modalities are possible. Searchers 130 send queries to a search engine 120. The search engine 120 responds to the queries based upon relevance (IR score) of document to a search query and node rank associated with the document. The combined score associated with the IR score and node rank of a document can be used to assess the quality of the results for the search. Such information can be communicated to a statistics collection and analysis engine 110. In some implementations, the system can track various user behaviors, such as, for example whether the user clicks on a result, how long the user examines the results of a click, whether the user tags or recommends this site, etc., and assess the quality of the search based on the tracked behaviors.

The statistics collection and analysis engine 110 can collect and analyze the query information. The query information can be analyzed to associate the queries with categories (e.g., topics). Queries can be associated with one another based upon commonalities in search results, search terms, or any other common factor. Moreover, the statistics collection and analysis engine can determine an aggregate relevance 310 and aggregate ranking 315 associated with the search results from search queries associated with a topic. The statistics collection and analysis engine 110, for example, can perform a statistics comparison 320 to compare the popularity of a topic with the aggregate quality of results for searches on the topic to determine whether a topic corpus 355 adequately serves the topic. The determination can be made, for example, based on comparison of the quality of the search results for the topic with the quality of search results for other topics with similar popularity based on search volume. Other ways to determine whether a topic corpus adequately serves the topic can also be used.

The statistics collection and analysis engine 110 can communicate topics having inadequate content to a topic distribution engine 210. The topic distribution engine 210, for example, can distribute the topics to content generators (e.g., online publishers 335) with knowledge of the subject. In some implementations, the topic distribution engine 210 can distribute topics based upon an underserved topic search engine, which can enable a content generator (e.g., a publisher, a user, etc.) to search for topics with which the content generator is familiar. As an example, if the content generator is familiar with network management, the content generator might use an underserved topic search engine to search for underserved topics related to network management.

The topic distribution engine 210, for example, can reorder the topics based upon a degree to which the topic is underserved 325. For example, the degree to which a topic is underserved can be based on a disparity between popularity of the topic and quality of the search results. Alternatively, the degree to which a topic is underserved can be based upon the popularity of searches related to a topic, or based upon an inverse of the quality associated with search results associated with a topic, or by some other determination.

In another implementation, the topic distribution engine 210 can sell information about topics 330. For example, if web publishers sell advertising or subscriptions, increasing visitors to a web page might increase revenues. Based upon such an increase in revenues, topics that attract more visitors could be sold to the web publishers. Other systems to distribute topics can be used.

Online publishers 335 can receive suggested topics using any suitable distribution system. The online publishers 335 can include ad based web publishers 340, user contribution based web publishers 345, and/or automated web publishers 350, among many others. The online publishers, for example, can provide additional content to a topic corpus 355. The web publishers, for example, can be encouraged to provide additional content through publisher incentive systems. Likewise, the publishers can be encouraged to provide additional content by the motivation for additional advertising or subscription sales.

The topic corpus 355 can include all of the documents relevant to searches related to a specified topic. The online topic corpus 355 includes, for example, a rank 360 and relevance 365 for each of the documents in the topic corpus 355. The rank and relevance of the documents can be combined to form an index, which is used by a search engine 120 to sort the search results. Additional content can be indexed based on rank and relevance of the new content and can be compared to the index of existing content to determine whether the additional content adds to the quality of search results for the specified topic. In some implementations, online publishers can be provided incentives for adding content that increases a quality ranking of content associated with the topic.

Figure 4:
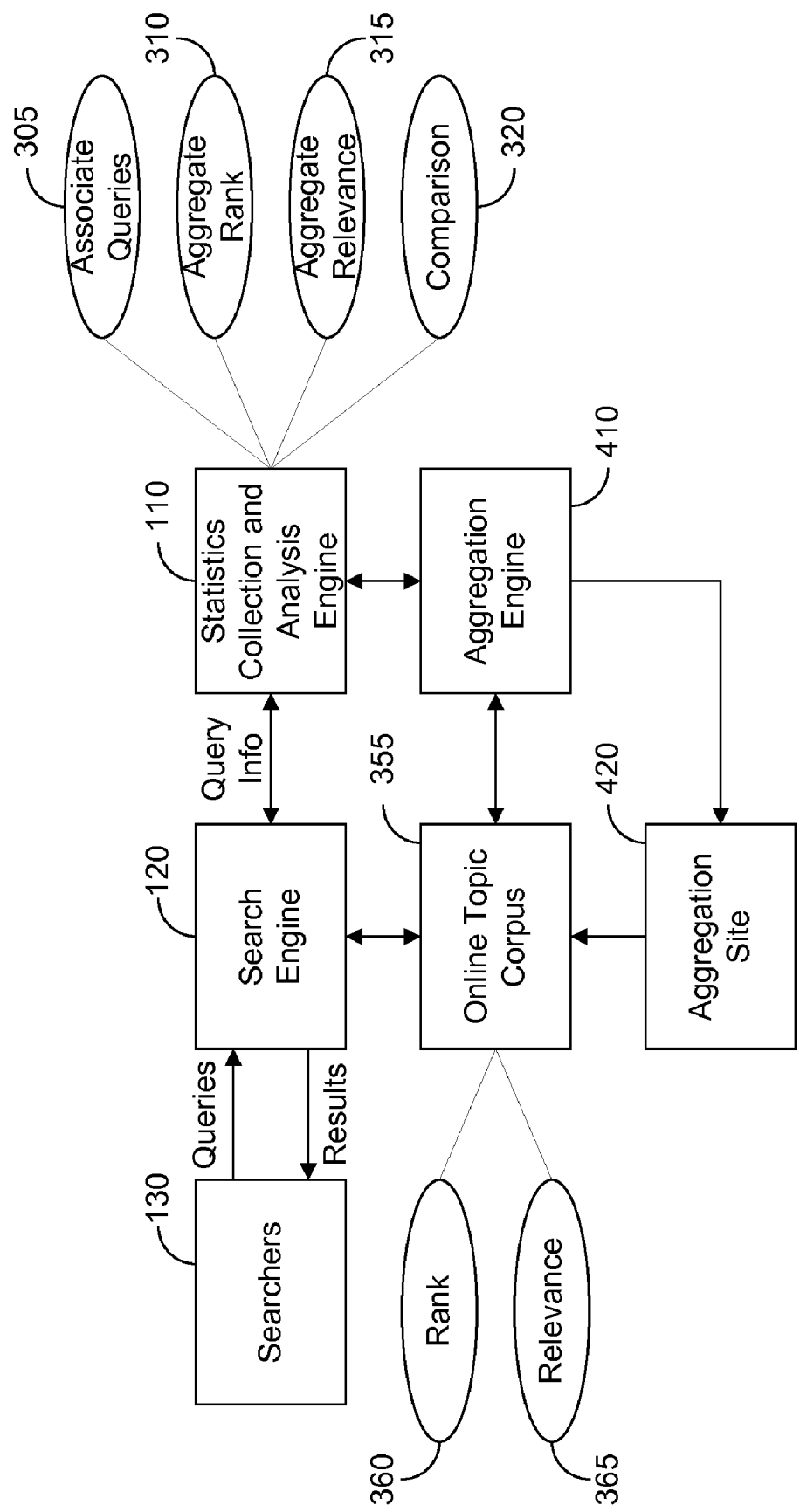
FIG. 4 is a block diagram illustrating data flow in a system to aggregate web content related to a topic identified as inadequately served.

FIG. 4 is a block diagram illustrating data flow in a system used to aggregate web content related to a topic identified as inadequately served. In some examples, low quality search results can be caused by content being spread between several documents. In such instances, content from the documents can be examined and edited for inclusion at a single address or site. In FIG. 4, an aggregation engine 410, for example, can operate to collect information included in a topic corpus 355. The aggregation engine 410 can then assemble the collected information and generate an aggregation site 420. The aggregation site 420, for example, can include links to each of the documents included in the topic corpus 355. In an implementation, the aggregation site 420 can include content copied from the topic corpus 355. In other implementations, the aggregation engine 410 can enable a user to edit the aggregated information or the aggregation site 420 to generate new content related to the topic. Such implementations can enable web publishers and/or individual users to more efficiently research a topic and provide content related to the topic.

FIG. 5 is a flowchart illustrating an exemplary method for identifying inadequate web content. At stage 500 search statistics are collected. The search statistics can be collected, for example, by a collection engine (e.g., statistics collection and analysis engine 110 of FIG. 1). The collection engine, for example, can be integrated into a search engine (e.g., search engine 120 of FIG. 1). The search statistics can include information about a search query, including, for example, a search string, refinements to the search string, results, relevance, ranking, etc. In one implementation, the search statistics are related to online searches. In another implementation, the search statistics can be related to searches provided by software programs, including, for example, "Help" features, intranet search engines, user contribution site search engines, etc.

At stage 510, the queries can be associated with a topic. The queries can be associated with a topic, for example, by an analysis engine (e.g., statistics collection and analysis engine 110 of FIG. 1). The analysis engine, in some examples, can be part of a search engine (e.g., search engine 120 of FIG. 1). The analysis engine can derive topics for example by using common terminology in search queries, analyzing the results of search queries for commonalities, analyzing refinements associated with search queries, etc.

The quality of a topic corpus can be compared to the search statistics at stage 520. The comparison of topic corpus quality to search statistics can be performed, for example, by an analysis engine (e.g., statistics collection and analysis engine 110 of FIG. 1). Quality of a topic corpus can be derived, for example, based on an index of the results from search queries associated with the topic. The index, for example, can be derived based on the relevance of a document to the search query, and a ranking of a document which is found to be relevant to the search query. The comparison, for example, can compare quality of topic corpuses between topics that have similar popularity, thereby determining whether the quality of a topic corpus meets, exceeds or falls below an expected level of quality, for example, a threshold, for a topic with a given popularity.

At stage 530, topics can be identified based upon the comparison. Topics can be marked, for example, by an analysis engine (e.g., analysis engine 110 of FIG. 1). Topics can be marked based on whether a topic corpus associated with the topic meets, exceeds, or falls below an expected quality associated with topics having similar search statistics. In some implementations, marked topics can be considered underserved. Underserved topics can be topics, for example, whose associated content is inadequate based upon the search statistics associated with the topic. The identified topics, thus can distinguish popular topics with inadequate content, thereby inviting content generators (e.g., content generators 220, 230, 240) to provide additional content.

FIG. 6 is a flowchart illustrating an exemplary method used to identify inadequate web content. At stage 600, a search request is received. The search request can be received, for example, by a search engine (e.g., search engine 120 of FIG. 1). The search request can include, for example, a search query identifying a subject.

At stage 610, the quality of search results is determined. The quality can be determined, for example, by a search engine (e.g., search engine 120 of FIG. 1). As described above, quality of the search results can be derived based on the relevance of documents to a search query and a ranking of the documents that are relevant to the search query. The relevance and ranking of the documents can be combined to form an index. The index, for example, can provide a quality index associated with the search results.

At stage 620, it is determined whether the quality of the search results is low. The determination of stage 620 can be made, for example, by a search engine (e.g., search engine 120 of FIG. 1). The search engine, for example, can compare the quality to a threshold quality to determine if the quality associated with the search results is low. Alternatively, the search engine can collect statistics associated with search queries and determine if the quality of a search result is low based upon a comparison of the quality of the search results to the quality of results of queries with similar search statistics.

If the search results are not low quality, the search results are returned to the searcher at stage 630. The search results can be returned, for example, by a search engine (e.g., search engine 120 of FIG. 1), using a network (e.g., network 140 of FIG. 1). The search results can be ordered based upon a quality index associated with each of the documents that comprise the search results.

If the search results are low quality, however, the searcher is notified at stage 640. The searcher can be notified, for example, by a search engine (e.g., search engine 120 of FIG. 1 or topic distribution engine 210 of FIG. 2) using a network (e.g., network 140 of FIG. 1). The search engine can notify the searcher by notifying the searcher that the results associated with the search yielded low quality results.

At stage 650 an invitation to add content is provided. The invitation can be provided, for example, by a distribution engine (e.g., topic distribution engine 210 of FIG. 2). In such implementations, the invitation can accompany the notification. The invitation, for example, can invite to the searcher to research the subject and provide additional content based on acquired knowledge, or to provide additional content based on the searcher's existing knowledge.

Figure 7:
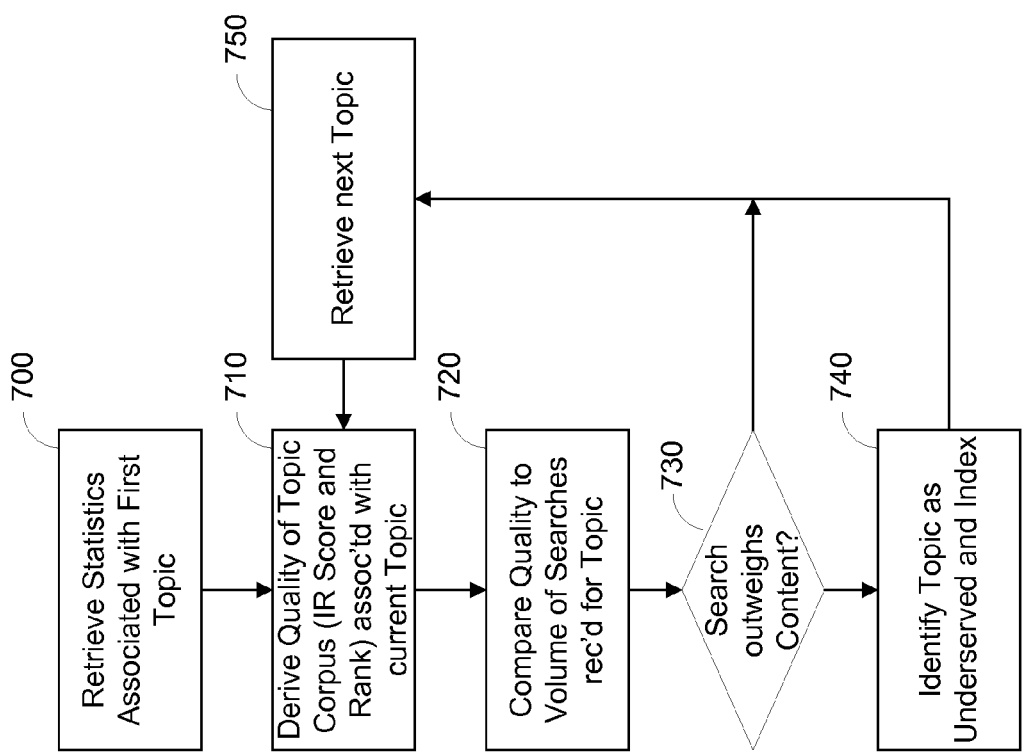

FIG. 7 is a flowchart illustrating an exemplary method for identifying inadequate web content. At stage 700, statistics associated with a first topic can be retrieved. The statistics can be retrieved, for example, by a statistics collection engine (e.g., statistics collection and analysis engine 110 of FIG. 1). The retrieved statistics can include, for example, search queries, search results, time and date information associated with search queries, refinements of search queries occurring during a search session, etc. Such data can be used to define topics, to identify popularity of a topic, to identify seasonal demand for a topic, etc.

At stage 710, quality associated with a topic is derived. The quality associated with a topic can be derived, for example, by an analysis engine (e.g., statistics collection and analysis engine 110 of FIG. 1). The quality can be derived, for example, based on an aggregation of relevance and ranking associated with documents that satisfy search queries related to the topic. In other examples, quality can be derived by, for example, a click through rate on the search results versus a refinement rate. Other information to derive quality associated with a topic corpus can also be used.

At stage 720, the quality of a topic corpus associated with a topic is compared to a search volume associated with the topic. The comparison can be performed, for example, by an analysis engine (e.g., statistics collection and analysis engine 110 of FIG. 1). The comparison can be made based on corpus quality, for example, in relationship to other topics with similar search volumes (e.g., what corpus quality would be expected based on a given search volume). Alternatively, the comparison can be made based on search volumes, for example, in relationship to other topics with similar corpus quality (e.g., what search volume would be expected based on a given corpus quality).

At stage 730, a determination is made whether the search volume outweighs the topic corpus. This determination can be made, for example, by an analysis engine (e.g., statistics collection and analysis engine 110 of FIG. 1, using a comparator, for example). The search volume outweighs the topic corpus, for example, based upon the comparison of the corpus quality (e.g., quality index) to the search volume (e.g., popularity). Other ways to determine whether the search volume outweighs the topic corpus can be used.

If the search outweighs the content, the topic is marked as underserved and is indexed at stage 740. The topic can be marked and indexed, for example, by an analysis engine (e.g., statistics collection and analysis engine 110 of FIG. 1). In some examples, the topic is marked as underserved, thereby providing for inclusion of the topic within an underserved topics search index. The topic can be indexed, for example, to note a degree to which the topic is underserved by the content (e.g., based on quality of the content associated with the topic). The topic can be alternatively or additionally identified to note a degree to which the topic is in demand (e.g., based on search volumes associated with the topic).

At stage 750, a next topic is retrieved. The next topic can be retrieved, for example, by an analysis engine (e.g., statistics collection and analysis engine 110 of FIG. 1). The topics can be retrieved, for example, from a topic store. As described above, the topics can be based on query clustering, for example. Stages 720, 730-740 can be repeated until the process ends.

In another implementation, the systems and methods herein can be used to identify content that is over-served. For example, content that has a much higher quality index associated with search results than would be expected based on the popularity of the topic. Web publishers can be notified of over-served content, for example, to enable the web publishers to avoid creating additional content for such topics.

In other implementations, identification of underserved/over served topics can be used by other types of publishers (e.g., offline publishers, such as print publishers). Such publishers can use the identification of underserved/over served topics to locate popular topics that are not being served by online content. For example, if searches for "biography of Millard Fillmore" and get only a few results, such publishers might contemplate commissioning a book about Millard Fillmore's life.

In other implementations, when products are searched, identification of underserved/overserved topics can help to gauge interest in the product. For example, if a statistics collection and analysis system (e.g., statistics collection and analysis engine 110 of FIG. 1) determines that searches for a product such as "purple alligator leather belt" are underserved, a retailer might consider offering such a product.

Systems and methods disclosed herein may use data signals conveyed using networks (e.g., local area network, wide area network, internet, etc.), fiber optic medium, carrier waves, wireless networks, etc. for communication with one or more data processing devices (e.g., computing device 130, search engine 120, etc.). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed is:

1. A computer-implemented method, comprising:
   obtaining, by a processing device, a query search volume value for each of a plurality of search queries, the query search volume value for each search query being proportional to a number of times that the search query has been received;
   grouping, by a processing device, the search queries that have been identified as relevant to a particular topic into a group of queries;
   identifying a topic corpus for the group of queries, the topic corpus being documents that were identified as responsive to the search queries in the group of queries;
   determining, by a processing device, that the particular topic is an underserved topic based on a relative topic corpus quality measure for the topic corpus being less than a threshold value, the relative topic corpus quality measure being a measure of relevance of the documents in the topic corpus relative to the query search volume value for the group of queries,
   receiving, by a data processing device, a search query corresponding to the underserved topic; and
   providing, by a data processing device and in response to receiving the search query, data that causes presentation of a notification that the search query corresponds to an underserved topic.

2. The method of claim 1, wherein determining that the particular topic is an underserved topic comprises:
   obtaining a measure of relevance of the topic corpus to the particular topic;
   computing the topic corpus quality measure based on the measure of relevance for the particular topic;
   obtaining a topic search volume value for the particular topic, the topic search volume value for the particular topic being computed based on the query search volume value for each of the queries in the group of queries that correspond to the particular topic;
   obtaining topic corpus quality measures for other topics, the other topics being topics that each have a topic search volume value that is within a threshold value of the topic search volume value for the particular topic; and
   determining that the topic corpus quality measure for the particular topic is lower than a threshold quality, the threshold quality being computed based on the topic corpus quality measures for the other topics.

3. The method of claim 1, wherein determining that the particular topic is an underserved topic comprises:
   obtaining a measure of relevance of the topic corpus to the particular topic;
   computing the topic corpus quality measure based on the measure of relevance for the particular topic;
   obtaining a topic search volume value for the particular topic, the topic search volume value for the particular topic being computed based on the query search volume value for each of the queries in the group of queries that correspond to the particular topic;
   obtaining topic search volume values for other topics, the other topics being topics that each have a topic corpus quality measure that is within a threshold value of the topic corpus quality measure for the particular topic; and
   determining that the topic search volume value for the particular topic is higher than a threshold volume, the threshold volume being computed based on the topic search volume values for the other topics.

4. The method of claim 1, wherein receiving a search query comprises receiving a search query requesting presentation of underserved topics that are identified as relevant to the search query.

5. The method of claim 4, wherein providing data that causes presentation of a notification comprises providing data that causes presentation of a plurality of underserved topics that are identified as relevant to the search query.

6. The method of claim 1, wherein receiving a search query comprises receiving a search query requesting search results that identify documents relevant to the search query.

7. The method of claim 6, wherein providing data that causes presentation of a notification comprises providing data that causes presentation of references to the documents, the data further causing presentation of an underserved topic to which the documents are relevant and notification that the underserved topic is underserved.

8. The method of claim 6, wherein providing data that causes presentation of a notification comprises providing data that causes presentation of references to the documents, the data further causing presentation of a notification that the documents referenced are relevant to an underserved topic.

9. The method of claim 1, further comprising providing data that causes presentation of a request for additional content that is relevant to the underserved topic.

10. The method of claim 1, further comprising:
receiving an additional document that is relevant to the underserved topic; and
providing compensation in response to receiving the additional document.

11. The method of claim 10, wherein providing compensation comprises providing compensation having a value computed based on a demand for the underserved topic and the topic corpus quality of the underserved topic.

12. A system, comprising:
at least one processor; and
a storage device in data communication with the at least one processor and storing:
a statistics collection engine that upon execution by a processor obtains a search query volume value for each of a plurality of search queries the query search volume value being proportional to a number of times that the search query has been received;
a statistics analysis engine that upon execution by a processor:
groups the search queries that have been identified as relevant to a particular topic into a group of queries; and
identifies a topic corpus for the group of queries, the topic corpus being documents that were identified as responsive to the search queries in the group of queries;
a comparator that upon execution by a processor determines that the particular topic is an underserved topic based on a relative topic corpus quality measure for the topic corpus being less than a threshold value, the relative topic corpus quality measure being a measure of relevance of the documents in the topic corpus relative to the query search volume value for the group of queries; and
a topic distribution engine that upon execution and in response to receiving the search query corresponding to an underserved topic provides data that causes presentation of a notification that the search query corresponds to an underserved topic.

13. The system of claim 12, wherein the upon execution by a processor the comparator:
obtains a measure of relevance of the topic corpus to the particular topic;
computes the topic corpus quality measure based on the measure of relevance for the particular topic;
obtains a topic search volume value for the particular topic, the topic search volume value for the particular topic being computed based on the query search volume value for each of the queries in the group of queries that correspond to the particular topic;
obtains topic corpus quality measures for other topics, the other topics being topics that each have a topic search volume value that is within a threshold value of the topic search volume value for the particular topic;
determines that the topic corpus quality measure for the particular topic is lower than a threshold quality, the threshold quality being computed based on the topic corpus quality measures for the other topics; and
identifies the particular topic as an underserved topic.

14. The system of claim 12, wherein a search query corresponding to the underserved topic comprises a search query requesting presentation of underserved topics that are identified as relevant to the search query.

15. The system of claim 14, wherein upon execution by a processor the topic distribution engine provides data that causes presentation of a plurality of underserved topics that are identified as relevant to the search query.

16. The system of claim 12, wherein a search query corresponding to the underserved topic comprises a search query requesting search results that identify relevant to the search query.

17. The system of claim 16, wherein upon execution by a processor the topic distribution engine provides data that causes presentation of references to the documents, the data further causing presentation of an underserved topic to which the documents are relevant and notification that the underserved topic is underserved.

18. The system of claim 12, further comprising a user contribution environment configured to receive additional content that is relevant to the underserved topic.

19. A memory device encoded with a computer program comprising instructions that when executed operate to cause a computer to perform operations:
obtaining a query search volume value for each of a plurality of search queries, the query search volume value for each search query being proportional to a number of times that the search query has been received;
grouping the search queries that have been identified as relevant to a particular topic into a group of queries;
identifying a topic corpus for the group of queries, the topic corpus being documents that were identified as responsive to the search queries in the group of queries;
determining that the particular topic is an underserved topic based on a relative topic corpus quality measure for the topic corpus being less than a threshold value, the relative topic corpus quality measure a measure of relevance of the documents in the topic corpus relative to the query search volume value for the group of queries;
receiving a search query corresponding to the underserved topic; and
providing, in response to receiving the search query, data that causes presentation of a notification that the search query corresponds to an underserved topic.

20. The memory device of claim 19, wherein identifying the underserved topic comprises:
obtaining a measure of relevance of the topic corpus to the particular topic;
computing the topic corpus quality measure based on the measure of relevance for the particular topic;
obtaining a topic search volume value for the particular topic, the topic search volume value for the particular topic being computed based on the query search volume value for each of the queries in the group of queries that correspond to the particular topic; and
obtaining topic corpus quality measures for other topics, the other topics being topics that each have a topic search volume value that is within a threshold value of the topic search volume value for the particular topic;
determining that the topic corpus quality measure for the particular topic is lower than a threshold quality, the threshold quality being computed based on the topic corpus quality measures for the other topics; and
identifying the particular topic as an underserved topic.

* * * * *

UNITED STATES PATENT AND TRADEMARK OFFICE
CERTIFICATE OF CORRECTION

| | | |
|---|---|---|
| PATENT NO. | : 8,037,063 B2 | |
| APPLICATION NO. | : 12/699418 | |
| DATED | : October 11, 2011 | |
| INVENTOR(S) | : Jeffrey David Oldham et al. | |

It is certified that error appears in the above-identified patent and that said Letters Patent is hereby corrected as shown below:

Title Page, Column 1, (75) Inventors, delete "Jeffrey D. Oldham" and insert --Jeffrey David Oldham--

In Column 13, Line 26, Claim 12, delete "queries" and insert --queries,--

In Column 13, Line 49, Claim 13, after "wherein" delete "the"

In Column 14, Line 38, Claim 19, before "a" insert --being--

Signed and Sealed this
Thirteenth Day of December, 2011

David J. Kappos
*Director of the United States Patent and Trademark Office*